us011983557B2

(12) United States Patent
Gitelman et al.

(10) Patent No.: US 11,983,557 B2
(45) Date of Patent: May 14, 2024

(54) ORCHESTRATION FOR DATA PIPELINE EXECUTION PLANS

(71) Applicant: Salesforce, Inc., San Francisco, CA (US)

(72) Inventors: Alex Gitelman, Berkeley, CA (US); Twisha Mehta, Fremont, CA (US); Stephen Petschulat, Coquitlam (CA); Alex Field, Vancouver (CA); LingTao Zhang, Coquitlam (CA)

(73) Assignee: Salesforce, Inc., San Francisco, CA (US)

( * ) Notice: Subject to any disclaimer, the term of this patent is extended or adjusted under 35 U.S.C. 154(b) by 118 days.

(21) Appl. No.: 16/779,040

(22) Filed: Jan. 31, 2020

(65) Prior Publication Data

US 2021/0240519 A1    Aug. 5, 2021

(51) Int. Cl.
*G06F 3/0484*      (2022.01)
*G06F 9/48*      (2006.01)

(52) U.S. Cl.
CPC ............ *G06F 9/485* (2013.01); *G06F 3/0484* (2013.01)

(58) Field of Classification Search
CPC .... G06F 9/485; G06F 3/0484; G06F 11/3006; G06F 11/0751; G06F 11/0772; G06F 11/3065; G06F 9/4881
See application file for complete search history.

(56) References Cited

U.S. PATENT DOCUMENTS

| | | | |
|---|---|---|---|
| 2003/0163507 A1* | 8/2003 | Chang | G06F 9/5038 718/100 |
| 2006/0117294 A1* | 6/2006 | Vogler | G06F 8/10 717/104 |
| 2007/0088525 A1* | 4/2007 | Fotiades | G06F 16/248 345/23 |
| 2008/0235659 A1* | 9/2008 | Manglik | G06F 11/366 717/111 |
| 2009/0210268 A1* | 8/2009 | Fan | G06Q 30/0603 705/26.1 |
| 2011/0218935 A1* | 9/2011 | Krowas | G06Q 40/08 705/36 R |
| 2012/0113135 A1* | 5/2012 | Sakai | G06K 9/00268 345/619 |
| 2013/0124649 A1* | 5/2013 | Triantos | H04L 51/046 709/206 |

(Continued)

*Primary Examiner* — Jennifer N Welch
*Assistant Examiner* — Parmanand D Patel
(74) *Attorney, Agent, or Firm* — Holland & Hart, LLP

(57) ABSTRACT

Methods, systems, and devices supporting dynamic process orchestration are described. An orchestration server may receive a request defining a data modification process from a user device. The orchestration server may generate an execution file based on the request, and the execution file may include a set of tasks for performing the data modification process and an order for performing the set of tasks. The orchestration server may execute, for the execution file, a first set of tasks according to the order for performing the set of tasks and, in some cases, may update the execution file based on executing the first subset of tasks. For example, updating the execution file may involve modifying a second subset of tasks of the set of tasks. The orchestration server may execute, for the updated execution file, the modified second subset of tasks according to the order for performing the set of tasks.

15 Claims, 12 Drawing Sheets

(56) References Cited

U.S. PATENT DOCUMENTS

| | | | | |
|---|---|---|---|---|
| 2014/0351818 A1* | 11/2014 | Katz | ............... | G06Q 10/0633 |
| | | | | 718/102 |
| 2015/0082317 A1* | 3/2015 | You | ............... | G06F 9/5094 |
| | | | | 718/104 |
| 2016/0357608 A1* | 12/2016 | Gupta | ............... | G06F 9/38 |
| 2017/0139680 A1* | 5/2017 | Proctor | ............... | G06F 9/5027 |
| 2018/0232110 A1* | 8/2018 | Cheung | ............... | G06F 3/0482 |
| 2018/0295154 A1* | 10/2018 | Crabtree | ............... | G06N 20/00 |
| 2019/0205186 A1* | 7/2019 | Zhang | ............... | G06F 9/4843 |
| 2019/0340033 A1* | 11/2019 | Ganteaume | ............... | G06F 16/3344 |
| 2020/0106829 A1* | 4/2020 | Alvelda, VII | ............... | H04L 67/568 |
| 2020/0233542 A1* | 7/2020 | Breedvelt-Schouten | ............... | |
| | | | | G06Q 10/063 |

* cited by examiner

ORCHESTRATION FOR DATA PIPELINE EXECUTION PLANS

FIELD OF TECHNOLOGY

The present disclosure relates generally to database systems and data processing, and more specifically to orchestration for data pipeline execution plans.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Some cloud platforms or other data processing systems may perform a group of processes (e.g., tasks) to generate, alter, or retrieve data in response to a user request. Some of the processes may be performed sequentially in order to ensure process dependencies are enforced. However, performing the processes sequentially may increase system latency and degrade user experience. In some cases, the group of processes may be performed in response to a user request, and the user may not be aware of all of the processes that are performed in response to the request. For example, the user may not be provided with information indicating which processes are being performed or when the various processes are performed. In some examples, this lack of insight into the performance of the processes may reduce the system flexibility and the user's understanding of and ability to update the system.

DETAILED DESCRIPTION

Figure 1:
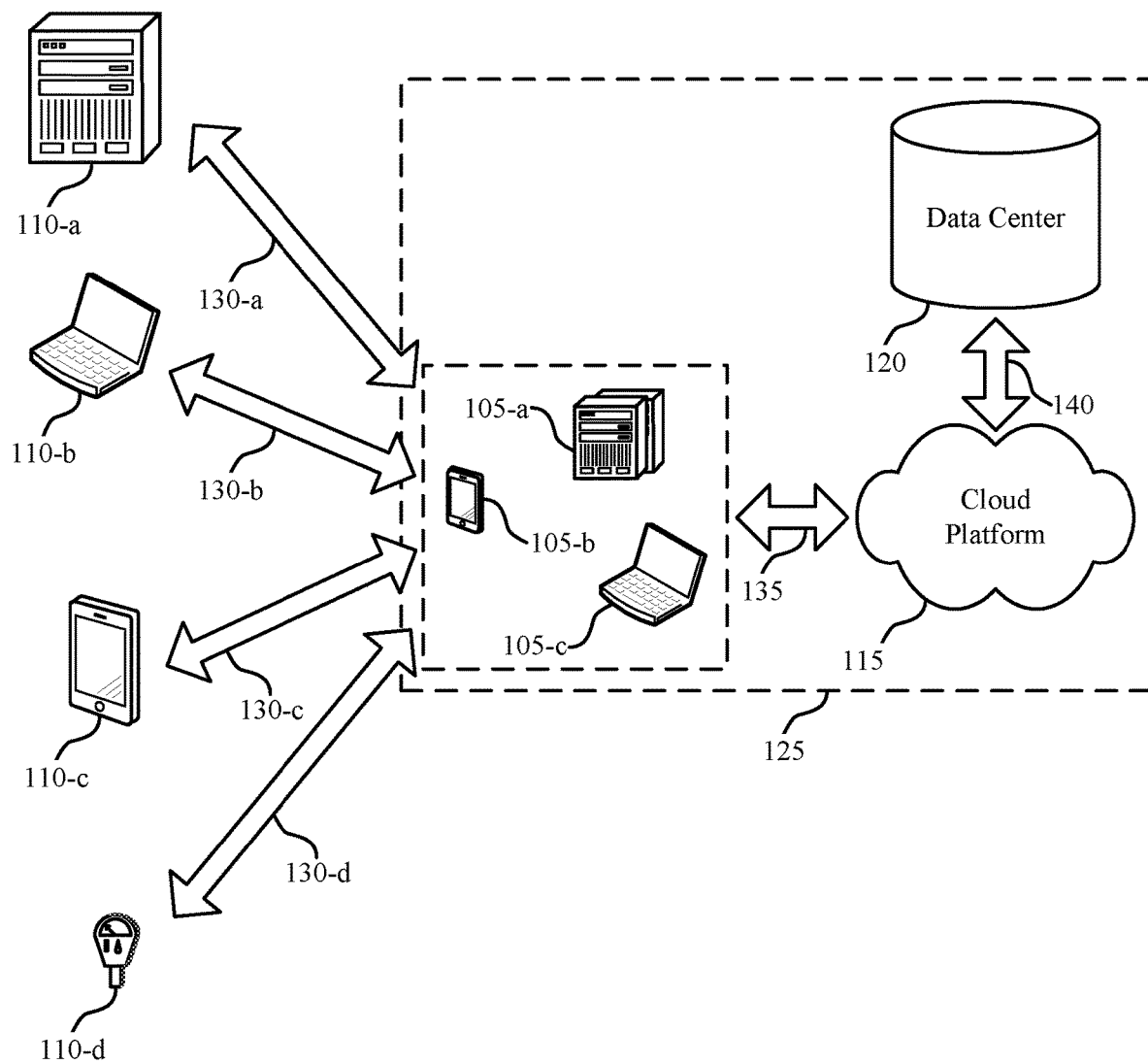
FIG. 1 illustrates an example of a system for data processing that supports orchestration for data pipeline execution plans in accordance with aspects of the present disclosure.

Some data management systems—such as cloud platforms—may orchestrate and perform multiple processes (e.g., tasks) or data transformations in response to a request. A group of tasks may be performed in response to the request, and some of the tasks may depend on other tasks, such that performing the tasks sequentially may ensure task dependencies are upheld. However, performing the tasks sequentially may increase system latency and degrade user experience. In some cases, a second task may rely on data generated or updated in a first task, so performing the second task before completion of the first task may result in errors or incorrect data. In some examples, performing a group of tasks in a particular order may restrict a user's ability to alter or provide input associated with the group of tasks. For example, once execution of the group of tasks has begun, a user may not be able to provide input (e.g., altering data associated with a task, altering an execution order of the tasks, canceling execution of the tasks, etc.) related to the tasks until all tasks are complete. In some cases, the second task may be predetermined and therefore lack the ability to respond to the results of the first task. Predetermined tasks may restrict system flexibility and a user's ability to provide input related to the tasks.

A process orchestration system may implement an execution plan to perform multiple tasks or data transformations, and the use of an execution plan may decrease system latency and improve user experience. A server (e.g., an orchestration server or other data processing device or system) may receive a request (e.g., a data modification request) from a user and generate an execution plan (e.g., an execution file) in response to the request. The execution plan may define or otherwise indicate a set of tasks and/or an ordering of the tasks, and the tasks may be used to perform a data modification process. In some cases, the execution plan may define relationships between the tasks, an ordering of the tasks, or both to ensure task dependencies are upheld. The orchestration server may perform (e.g., execute) a first subset of tasks that is included or otherwise indicated in the execution plan. The tasks within the first subset of tasks may be independent of each other (e.g., the tasks in the first subset may not depend on other tasks in the first subset) and may therefore be performed concurrently. Performing tasks within a first subset concurrently may decrease system latency and improve user experience while upholding task dependencies.

The orchestration server may update the execution plan based on execution of the first subset of tasks. In some examples, the orchestration server may modify a second subset of tasks on-the-fly based on the first subset of tasks. For example, the orchestration server may create additional tasks and/or change the order of tasks associated with the execution plan based on a result of a performed task, thereby dynamically updating the execution plan. In some cases, dynamically updating the execution plan may prevent processing errors and allow users to update or otherwise alter the orchestration of ongoing tasks. Dynamically updating the execution plan may be based on user input or the result of a performed task. In some cases, a user may input or indicate a value to update, a process to abort, or some other input to otherwise alter the execution plan.

The orchestration server may perform the second subset of tasks. In some cases, a user may be notified of execution plan progress. The notification may be based on a completed task, a failed task, a task result, or a user request enabling progress notifications. Performing tasks based on the execution plan and updating the execution plan based on performed tasks may provide the user with insights into the status of the execution plan and may allow a user to receive notifications related to performing the tasks. Performing tasks based on the execution plan may support dynamic task processing and may reduce system errors.

Aspects of the disclosure are initially described in the context of an environment supporting an on-demand database service. Aspects of the disclosure are further described with respect to a process orchestration system, task orchestration systems, a system architecture, and a process flow diagram. Aspects of the disclosure are further illustrated by and described with reference to apparatus diagrams, system diagrams, and flowcharts that relate to orchestration for data pipeline execution plans.

FIG. 1 illustrates an example of a system 100 for data processing that supports orchestration for data pipeline execution plans in accordance with aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, the data center 120 may include multiple databases, servers, or other types of systems. For example, the data center 120 may include an orchestration server, an application server, or a database. In some cases, the orchestration server may support orchestration for data pipeline execution plans. The cloud platform 115 or an orchestration server of subsystem 125 may receive a request from a cloud client 105 or a contact 110. The orchestration server may generate an execution plan (e.g., an execution file) based on the request, and the execution plan may include a set of tasks for performing a data modification process and an order for performing the tasks. In some cases, the data modification process may be indicated by the request received from the cloud client 105 or the contact 110. The orchestration server may execute a first subset of tasks according to the order for performing the tasks. The orchestration server may update the execution plan and modify a second subset of tasks based on executing the first subset of tasks. For example, the orchestration server may remove tasks from the execution plan, add tasks to the execution plan, alter the order of the tasks as indicated in the execution plan, or alter parameters of the tasks (e.g., inputs, outputs, systems for performing the tasks, etc.) in the execution plan based on executing the first subset of tasks. Updating the execution plan based on executing the first subset of tasks may prevent errors and/or reduce system latency. The orchestration server may execute the modified second subset of tasks according to the order for performing the set of tasks.

In some other systems, tasks may be performed concurrently, and task dependencies may not be upheld, which may yield errors and/or inaccurate data. In some examples, tasks may be performed sequentially to uphold task dependencies. Performing tasks sequentially may increase system latency and degrade user experience. In some additional or alternative examples, a user may initiate the performance of a group of tasks and then need to cancel or alter the group of tasks. In some cases, the canceling and/or altering of tasks may not be supported during execution. For example, a series of sequential tasks may be created and performed, and the series of tasks may be static, so a user may lack the ability to cancel or alter the tasks once execution of the tasks has been initiated.

In contrast, the system 100 may implement orchestration for data pipeline execution plans, which may dynamically manage task dependencies, support task execution based on user input, and increase system concurrency. For example, an application server of subsystem 125 may receive a request defining a data modification process, and the application server may generate, based on the request, an execution plan (e.g., an execution file) that includes a set of tasks for performing the data modification process and an order for performing the set of tasks, execute a first subset of tasks for the execution plan, update the execution plan based on executing the first subset of tasks, and execute a second subset of tasks for the updated execution plan according to the order for performing the set of tasks. Orchestration for data pipeline execution plans may support dynamic task orchestration that parallelizes tasks while upholding task dependencies. For example, the first subset of tasks may be performed in parallel, and the second subset of tasks may be performed in parallel. Dynamic task orchestration may support the dynamic execution of tasks, and a user may cancel or alter tasks during task execution. For example, the execution plan may be updated based on user input, and the execution of the second subset of tasks may be based on the updated execution plan. Based on dynamic task orchestration, a server may perform data processing tasks while upholding task dependencies, supporting user input, optimizing task execution, or performing some combination thereof.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Users of computing and cloud platforms may request a data modification process to transform a dataset of a first type into a dataset of a second type. For example, data may be spread across multiple different systems, and the user may request the data be retrieved and modified into a human-readable format. A system supporting orchestration for data pipeline execution plans may generate an execution plan based on the request. In some cases, the execution plan includes a set of tasks for performing the data modification process and an order for performing the tasks. The execution plan may indicate that the tasks for retrieving the data from the multiple different system be performed concurrently. The retrieved data may be transformed into a first form (e.g., extensible markup language (XML)), and the user may indicate that they want the data to be transformed into a second form (e.g., JavaScript object notation (JSON)). The execution plan may be dynamically updated to indicate that an additional task is to be performed to transform the XML, data into JSON data. The task orchestration may thereby support dynamic task orchestration while upholding task dependencies.

Figure 2:
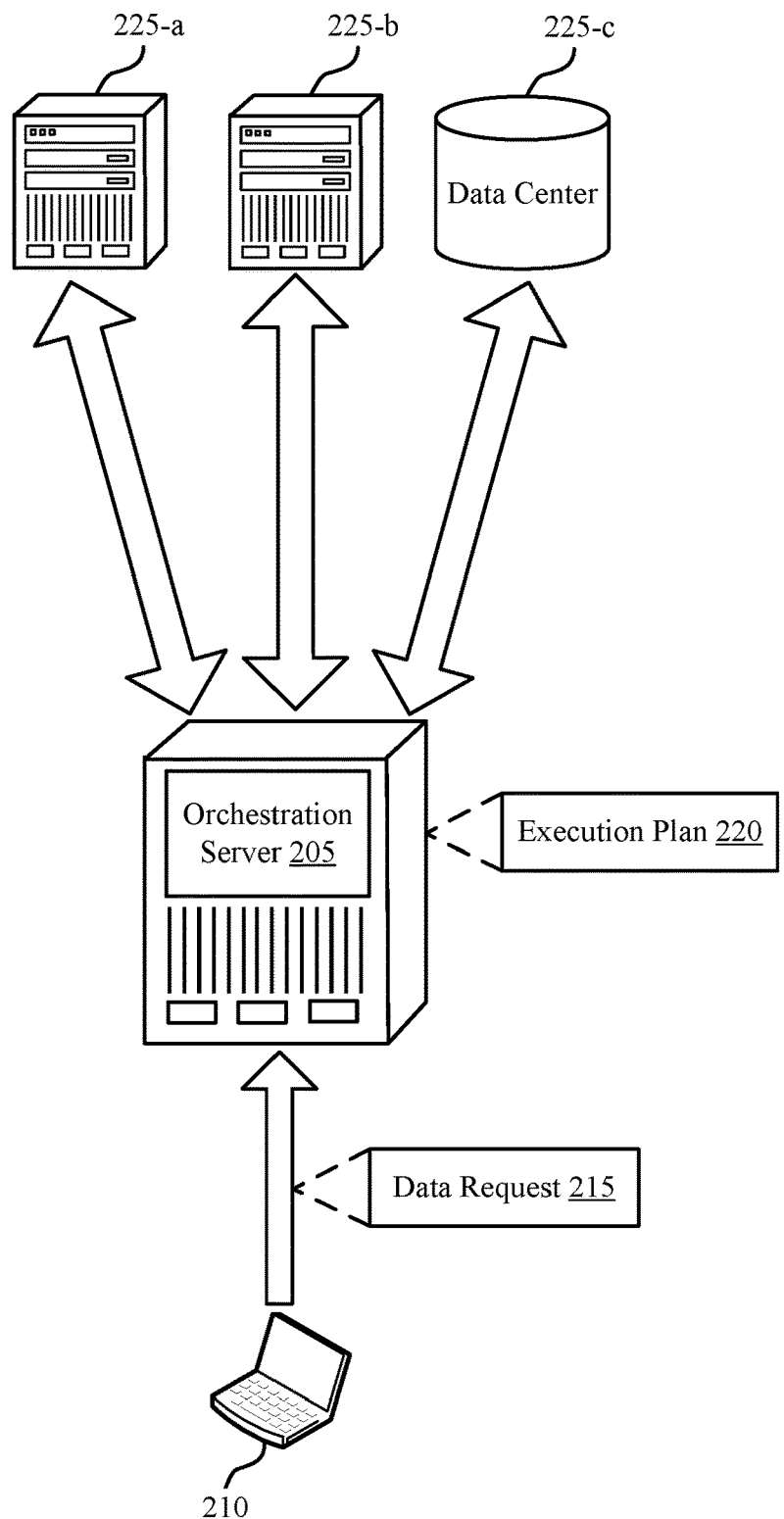
FIG. 2 illustrates an example of a process orchestration system that supports orchestration for data pipeline execution plans in accordance with aspects of the present disclosure.

FIG. 2 illustrates an example of a process orchestration system 200 that supports orchestration for data pipeline execution plans in accordance with aspects of the present disclosure. The process orchestration system 200 includes an orchestration server 205, a user device 210, a data request 215, an execution plan 220, and systems 225. The system 200 may implement aspects of a system 100 as described with reference to FIG. 1. For example, an orchestration server 205 and/or a system 225 may be examples or components of a data center 120, a cloud platform 115, or a subsystem 125. In some cases, the process orchestration system 200 may orchestrate data processing across multiple systems 225 while offering a single view to a user device 210.

The orchestration server 205 may represent aspects of an application server, communication server, data processing server, database server, cloud-based server, server cluster, virtual machine, container, or some similar data processing device or system. The orchestration server 205 may communicate with other devices such as user device 210 and/or one or more systems 225. The orchestration server 205 may receive a data request 215 from the user device 210, and the data request 215 may define a data modification process. In some cases, the orchestration server 205 may determine, based on the received data request 215, to generate an execution plan 220 (e.g., an execution file). For example, the orchestration server 205 may determine that multiple tasks (e.g., processes) may be performed to service the received data request 215, and one or more systems 225 may be associated with the multiple tasks.

In some cases, the orchestration server 205 may generate the execution plan 220 based on the data request 215. The orchestration server 205 may identify a set of tasks to perform in response to the received data request 215, and the orchestration server 205 may generate the execution plan 220 based on the data request 215 and/or the set of tasks. In some examples, there may exist dependencies amongst the set of tasks. For example, one task may depend on data obtained through execution of another task, and the execution plan 220 may impose an ordering or the set of tasks. For example, the execution plan 220 may group the set of tasks into subsets, and the tasks within a particular subset may not depend on other tasks within the same subset. The execution plan 220 may be organized to optimize system runtime efficiency while preserving data dependencies. As such, the execution plan 220 may improve user experience by reducing system latency and ensuring accurate data.

The orchestration server 205 may execute a first subset of tasks according to the ordering of the set of tasks. In some examples, the orchestration server 205 may execute tasks that do not depend on one another so that the tasks can run concurrently (e.g., on one or more threads, systems, or machines), thereby improving system efficiency. For example, the first subset of tasks may include tasks that do not have task dependencies on any other tasks in the first subset and may therefore be executed in parallel. As tasks of the first subset are completed, the execution plan 220 may be updated. For example, when a task of the first subset is completed, the orchestration server 205 may update the execution plan 220 to indicate that the task is completed. In some additional or alternative examples, the orchestration server 205 may update the execution plan 220 when all of the tasks of the first subset are complete. For example, the orchestration server 205 may update the execution plan 220 to indicate that all tasks of the first subset are complete.

The orchestration server 205 may receive indications from the systems 225 when tasks of the first subset are complete. In some cases, the orchestration server 205 may receive indications from the systems 225 based on requests sent from the orchestration server 205 to the system 225. The orchestration server 205 may communicate with the systems 225 via hypertext transfer protocol (HTTP), hypertext transfer protocol secure (HTTPS), message queueing telemetry transport (MQTT), simple mail transfer protocol (SMTP), extensible messaging and presence protocol (XMPP), another application layer protocol, or any combination therefore. The orchestration server 205 may update the execution plan 220 based on an indication received from a system 225.

For example, the execution plan 220 may define a task associated with extracting statistical information from a dataset by system 225-a as part of a first subset of tasks and a task associated with transforming the statistical information into a visual representation by system 225-b as part of a second subset of tasks. The orchestration server 205 may receive a message from system 225-a indicating that system 225-a is to be provided with the dataset in order to complete the task. In this example, the orchestration server 205 may determine that the dataset is stored in system 225-c and dynamically update the task ordering and underlying systems 225 for performing the tasks that are defined in the execution plan 220. For example, the execution plan 220 may be updated such that a task associated with retrieving the dataset from system 225-c is part of a first subset of tasks, a task associated with extracting statistical information from the dataset by system 225-a is part of a second subset of tasks, and a task associated with transforming the statistical information into a visual representation by system 225-b is part of a third subset of tasks.

Figure 3:
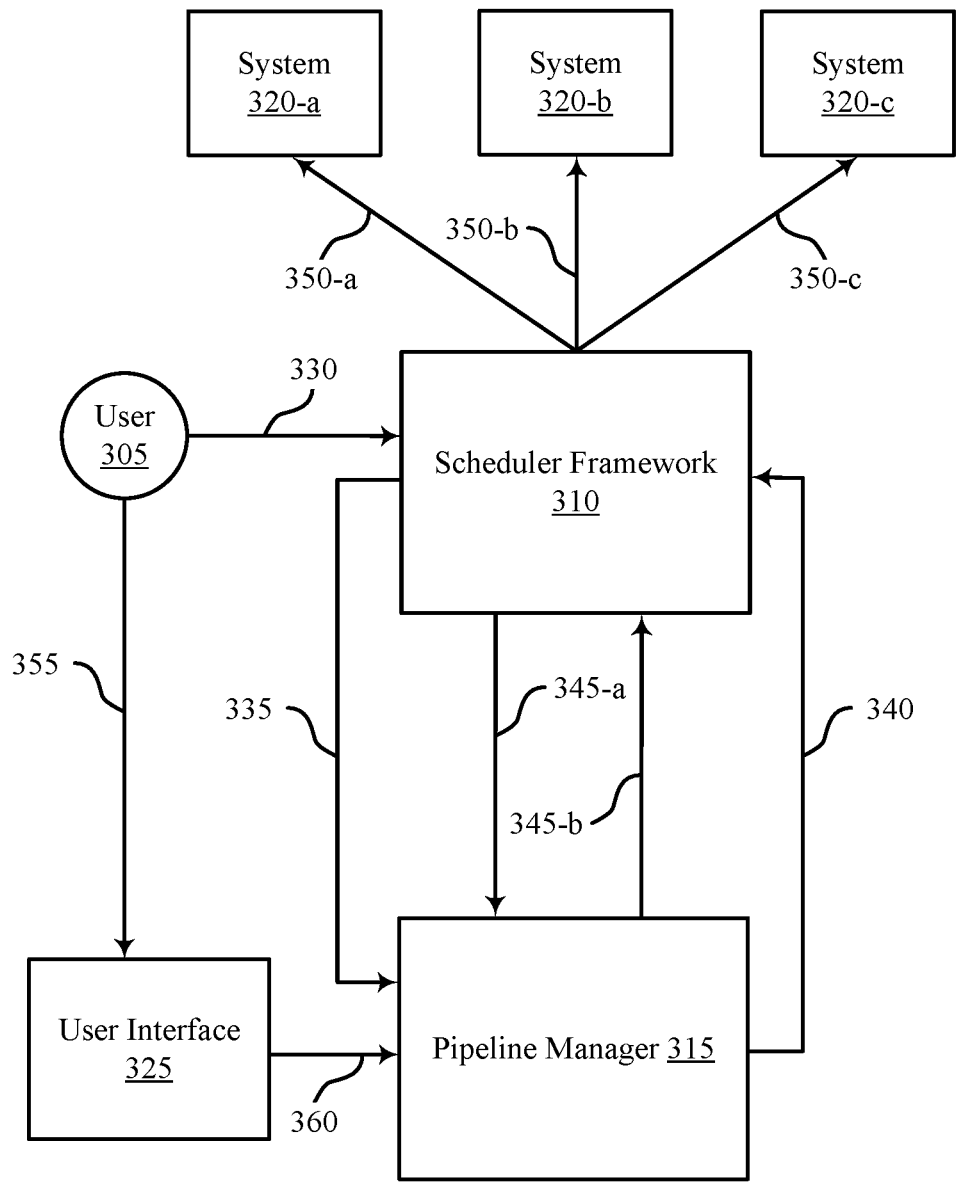
FIGS. 3 and 4 illustrate examples of task orchestration systems that support orchestration for data pipeline execution plans in accordance with aspects of the present disclosure.

FIG. 3 illustrates an example of a task orchestration system 300 that supports orchestration for data pipeline execution plans in accordance with aspects of the present disclosure. The task orchestration system 300 includes a user 305, a scheduler framework 310, a pipeline manager 315, systems 320, and a user interface 325, which may be examples or components of one or more servers and/or cloud platforms as described with reference to FIGS. 1 and 2. For example, the scheduler framework 310, the pipeline manager 315, the systems 320, or some combination thereof may be examples or components of a data center 120, a cloud platform 115, or an orchestration server 205. The user interface 325 may be an example of or associated with cloud clients 105 or contact 110 as described with reference to FIG. 1. For example, the user 305 may operate a user device including the user interface 325. By interacting with the user interface 325, the user 305 may define or modify data modification processes supported by the task orchestration system 300.

The scheduler framework 310 may represent aspects of an orchestration server, application server, communication server, data processing server, database server, cloud-based server, server cluster, virtual machine, container, or some similar data processing device or system. The scheduler framework 310 may communicate with other devices or components such as a number of systems 320, a user device operated by a user 305, or a pipeline manager 315.

The user 305 may input a request to perform a data modification process into a user device (e.g., via a user interface 325). At 330, the user device may transmit a request to the scheduler framework 310, and in some cases, the request may indicate that an orchestrated execution (e.g., a recipe execution) is to be performed. At 335, the task orchestration system 300 may recognize a specific pipeline manager 315 (e.g., from a set of supported pipeline managers 315) that can handle the request, and the specific pipeline manager 315 may claim the request. The pipeline manager 315 may generate an execution plan (e.g., an execution file) for handling the request. In some cases, the execution plan may be an example of a file (e.g., written in a low-level assembly language or the like) coordinating processes for multiple dataflows. For example, the pipeline manager 315 may recognize the request as a data transformation request, indicate that the pipeline manager 315 will process the request, and generate an execution plan associated with processing the request.

In some cases, at 340, the pipeline manger 315 may transmit the execution plan (or one or more portions of the execution plan) to the scheduler framework 310, and the scheduler framework 310 may execute tasks based on the execution plan. The scheduler framework 310 may communicate with the pipeline manager 315 (e.g., at 345-a and 345-b) to ensure the correct payload is generated for each task, where a payload may be an example of a JSON file indicating what data processes to perform on which systems 320. The scheduler framework 310 may execute the tasks on system 320-a, 320-b, 320-c, or any combination thereof at 350-a, 350-b, 350-c, or any combination thereof, respectively. The scheduler framework 310 may execute the tasks based on the execution plan. In some cases, the scheduler framework 310 may execute the tasks using one or more of system 320 based on the execution plan, and the tasks may be executed in an order according to the execution plan. In some implementations, the scheduler framework 310 may perform a data process based on communicating with one or more systems 320. In some other implementations, the scheduler framework 310 may communicate with the one or more systems 320 to instruct a system 320 to perform a data process. Executing the tasks based on the execution plan may ensure task dependencies are upheld, which may prevent errors and/or invalid payloads.

In some cases, the user 305 may use the user interface 325 to observe and/or influence the task orchestration system 300. In some examples, the user interface 325 may present information to the user 305. For example, the user interface 305 may display progress notifications based on the pipeline manager 315, the scheduler framework 310, or both. In some cases, the pipeline manager 315 may accept user input from the user interface 325, which may support dynamic updating of the execution plan and thereby improve user experience. For example, if the user 305 wants to cancel a request that was transmitted to the scheduler framework 310, the user 305 may input a cancelation request via the user interface 325 at 355, and the user interface 325 may transmit the cancelation request to the pipeline manager 315 at 360. The pipeline manager 315 may remove the execution plan or otherwise update the execution plan to indicate that the user 305 transmitted a cancelation request. The user interface 325 may additionally or alternatively allow the user to select or otherwise input values, and this user input may improve the flexibility of the task orchestration system 300.

The task orchestration system 300 may operate using the notion of a "dataflow" as an execution unit of data processing. Each dataflow may generate a dataset that can be used for data analytics (e.g., by an analytics server or an end user 305). In some cases, each dataflow may be executed by a single host (e.g., a single host server or system) in a dedicated instance of a cloud-based infrastructure. The user interface 325 may display information to a user 305 about a dataflow execution (e.g., whether the dataflow is in progress, queued, successful, failed, etc.). Dataflow execution may be asynchronous, as a core application server may send the execution request and be driven by events generated during execution on a worker host. Once a dataflow is successfully completed, the resulting dataset may become available to an end user 305.

An execution plan (which may be referred to as an execution file) may extend the concept of dataflows across multiple data processes and/or systems 320. For example, some data processes—such as replication-based dataflows, among other examples—may use multiple dataflows in sequence or in parallel. An execution plan may be an example of a JSON document that describes a list of tasks in such a way as to enforce correct ordering and coordination of the tasks. The task orchestration system 300 may support running an execution plan across multiple systems 320 to support complex data processes. In one specific example, an execution plan may involve system 320-a preparing input data concurrent to system 320-b preparing additional input data. System 320-c may support distributed processing and may transform all of the input data into resulting values. Another system 320 may convert the results into a dataset usable by a user 320 (e.g., for analytics operations).

To support such a use case (and similarly complex data processing), the task orchestration system 300 may provide end-to-end process orchestration across heterogeneous systems. The task orchestration system 300 may provide a holistic view of the execution to a user 305 in a user interface 325. For instance, with reference to the above example, the user interface 325 may display a single step "Preparing the Data" (e.g., for the processes performed by systems 320-a and 320-b), followed by the step "Transforming the Data," and ending with a last step "Finalizing the Data." The user 305 may interact with the entire process as a whole via the user interface 325 while the systems 320 operating on the backend are kept transparent to the user 305. Additionally, the execution plan may be modified throughout execution (e.g., based on executed steps or user input) such that some steps or step parameters may dynamically change during execution.

In some systems, the scheduler framework 310 and pipeline manager 315 may run on one or more core application server hosts. These components may operate on "recipes," which may indicate which data modifications to perform on what information. Users 305 may create or select recipes in a user interface 325. For example, a recipe may specify how data is processed, including support for filtering, joining, grouping, sorting, validating, format conversions, or any other data processing operations. Recipes may be executed based on a user input, an execution schedule, or any other execution trigger (e.g., a particular input to the task orchestration system 300, an event at an external system 320, etc.). In this way, the task orchestration system 300 provides a uniform component (e.g., using the scheduler framework 310 and pipeline manager 315 or some similar system or component performing similar operations to the scheduler framework 310 and pipeline manager 315) that can manage data pipelines across multiple systems 320.

Specifically, the task orchestration system 300, via a pipeline manager 315 (which may be referred to as a data pipeline manager), may provide an observational component for executing dataflows. In some cases, the task orchestration system 300 may include multiple pipeline managers 315 supporting different logic for handling different data processes, different systems 320, or some combination thereof. In some examples, the scheduler framework 310 may operate on individual tasks, steps, or dataflows (e.g., in isolated or siloed contexts). In contrast, a pipeline manager 315 may observe (e.g., track the execution of) all currently executing tasks, steps, or dataflows (e.g., for a particular execution file, for a particular tenant, across tenants in a multi-tenant system, etc.) and may inject orchestrated components into one or more tasks, steps, or dataflows based on the observation. In some cases, the pipeline manager 315 may determine to modify a dataflow based on a dataflow type, a result of another dataflow, a parameter input by a user, or some combination thereof. In this way, the task orchestration system 300 may adaptively handle multiple inter-dependent dataflows across multiple systems 320 in a dynamic, flexible implementation.

Figure 4:
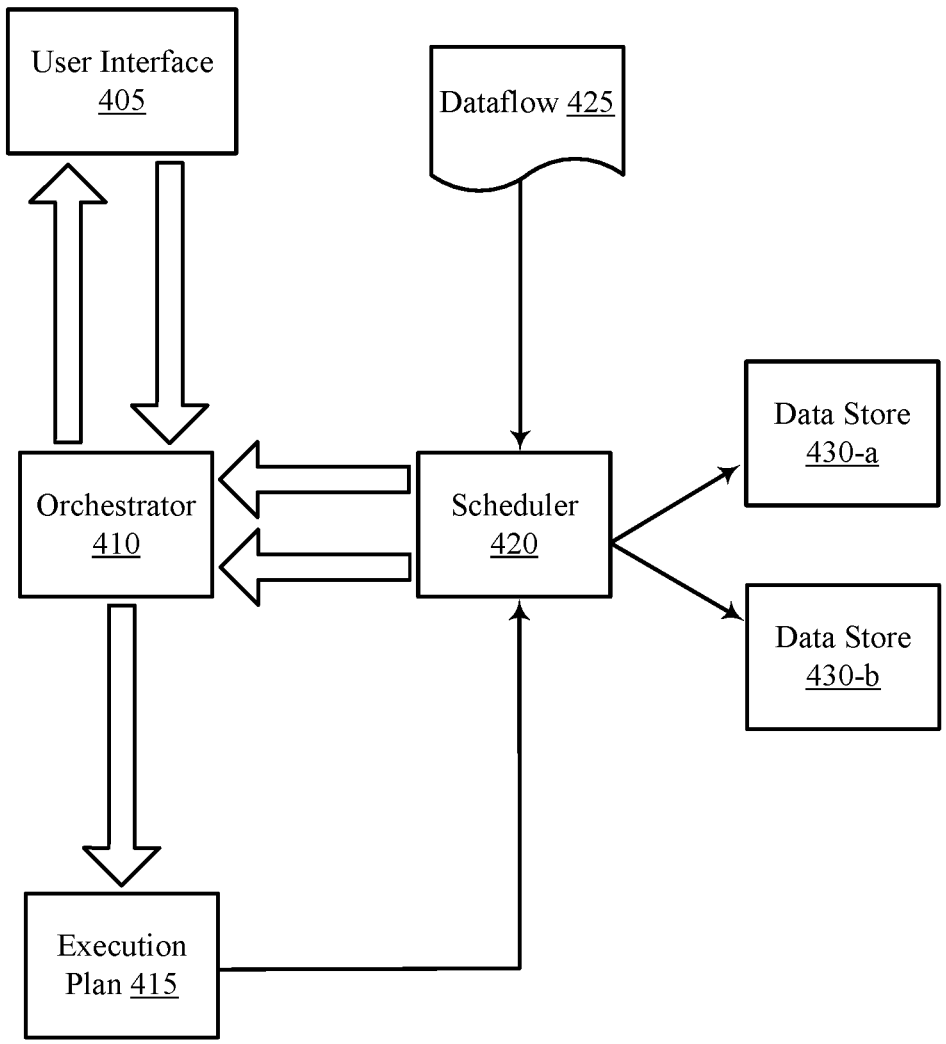

FIG. 4 illustrates an example of a task orchestration system 400 that supports orchestration for data pipeline execution plans in accordance with aspects of the present disclosure. The task orchestration system 400 includes a user interface 405, an orchestrator 410, an execution plan 415 (e.g., including a number of tasks), a scheduler 420, a dataflow 425, and a number of data stores 430, which may be examples or components of one or more servers and/or cloud platforms as described with reference to FIGS. 1, 2, and 3. For example, the orchestrator 410, the execution plan 415, the scheduler 420, the dataflow 425, the data stores 430, or some combination thereof may be examples or components of a data center 120, a cloud platform 115, an orchestration server 205, a scheduler framework 310, a pipeline manager 315, or a system 320. The user interface 405 may be an example of or associated with cloud clients 105 or contacts 110 as described with reference to FIG. 1. The task orchestration system 400 may illustrate a specific implementation of the task orchestration system 300 as described herein. However, many other implementations of the task orchestration system 300 may be supported by a data processing system.

In some cases, a user device including the user interface 405 may transmit a request to the orchestrator 410 (e.g., based on a user input), and the request may indicate how data is to be processed (e.g., how to filter the data, how to join the data, how to group the data, etc.). The user may request orchestrated execution (e.g., a recipe execution) through the user interface 405, or the user may schedule the orchestrated execution to run at a particular time or on a particular schedule. The orchestrator 410 may recognize the requested or otherwise scheduled orchestrated execution and claim the orchestrated execution. The orchestrator 410 may create and start execution plan 415. In some cases, the execution plan 415 may indicate particular tasks that are to be performed, and the execution plan 415 may indicate ordering or dependencies amongst the tasks. The execution plan 415 or an indication of the execution plan 415 may be transmitted to the scheduler 420. The scheduler 420 may execute one or more dataflows 425. In some cases, the one or more dataflows 425 may not depend on each other and may therefore be performed concurrently. Performing the one or more dataflows 425 concurrently may increase system parallelism, decrease processing time, and improve user experience.

In an example, one or more dataflows 425 may be considered a pre-step, and the one or more dataflows 425 may convert analytics input datasets into comma-separated values (CSVs) or other data forms that can be consumed in later stages. In some cases, completed dataflows 425—or the output of completed dataflows 425—may be placed in data stores 430. For example, completed dataflows 425 may be placed in a data store 430-a, and data store 430-a may be an example of an intermediate storage. The scheduler 420 may execute a transformation task. In some cases, the transformation task may be scheduled after the pre-step is complete, and the transformation task may transform data that is stored in data store 430-a. The transformation task may be performed by data store 430-b or an alternative system. In some cases, data store 430-b may be an example of a cluster, resilient distributed dataset (RDD), or the like. When the transformation task is complete, the resulting dataset may be placed back in data store 430-a. In some cases, the scheduler 420 may execute a task to process the transformed data and/or convert the transformed data into an analytics dataset. The orchestrator 410 may receive a dataset (e.g., the analytics dataset) and provide the dataset to the user interface 405. In some cases, the user interface 405 may present a single execution item, and the execution item may include multiple steps. For example, the user interface 405 may present a single execution item based on the orchestrated execution, and the execution item include a pre-step, a transformation step, and a conversion (e.g., analytics) step. The user interface 405 may display progress, errors, or results associated with the orchestrated execution.

Figure 5:
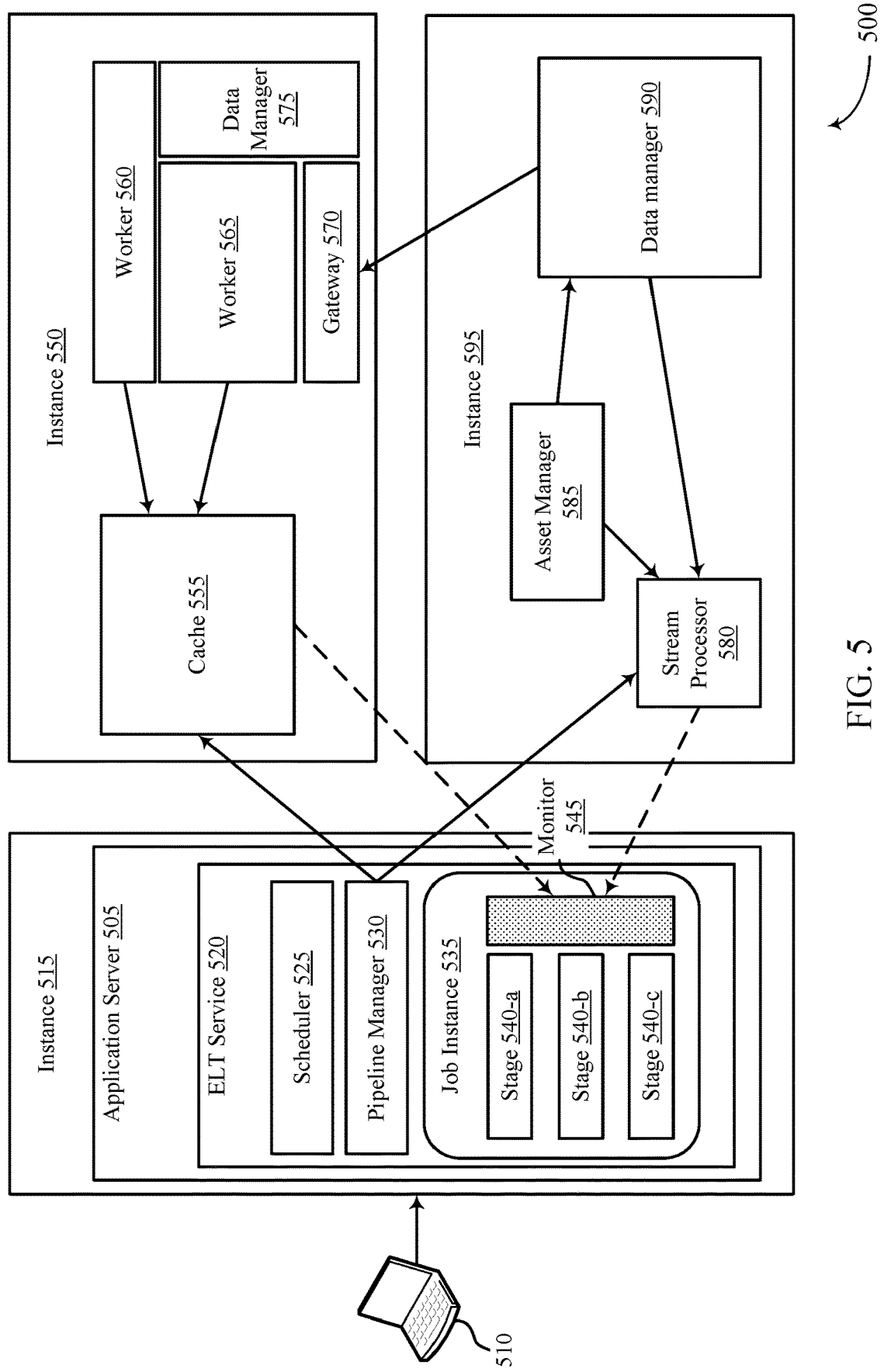
FIG. 5 illustrates an example of a system architecture that supports orchestration for data pipeline execution plans in accordance with aspects of the present disclosure.

FIG. 5 illustrates an example of a system architecture 500 that supports orchestration for data pipeline execution plans in accordance with aspects of the present disclosure. The system architecture 500 includes a user device 510, an application server 505, an instance 515 (e.g., a host, a pod, etc.), an extract, load, transform (ELT) service 520, a scheduler 525, a pipeline manager 530, a job instance 535, stages 540, a monitoring component 545, an instance 550 (e.g., a host, a superpod, etc.), a cache 555 (e.g., a remote dictionary server (Redis)), a worker 560 (e.g., a query worker), a worker 565 (e.g., an ELT worker), a gateway 570 (e.g., an M3 gateway), a data manager 575 (e.g., a system or tool for facilitating deployments), a stream processor 580 (e.g., a distributed streaming platform for building data pipelines, such as Apache Kafka®), an asset manager 585 (e.g., a simple asset manager (SAM) service), a data manager 590 (e.g., a unified analytics engine for large-scale data processing), an instance 595, or some combination thereof. Any of these components or systems may be examples or components of one or more servers and/or cloud platforms as described with reference to FIGS. 1 through 4. It is to be understood that the system architecture 500 illustrates an example system architecture including an example set of components, and other system architectures may implement orchestration for data pipeline execution plans as described herein.

The application server 505 may represent aspects of an application server, communication server, data processing server, database server, cloud-based server, server cluster, virtual machine, container, or some similar data processing device or system. The application server 505 may communicate with other devices such as a number of other servers and/or a user device 510. The application server 505 may receive a request from a user device 510, and the request may define a data modification process. The application server 505 may generate an execution plan (e.g., an execution file) based on the request, and the execution file may include a set of tasks for performing the data modification process. The application server 505 may execute a first subset of tasks, and in some cases, the tasks may be performed in accordance with a queue. For example, the application server 505 may transmit the first subset of tasks to the cache 555, and the worker 560 and/or worker 565 may perform the tasks. In some examples, the worker 560 may retrieve the tasks from the cache 555, and the worker 565 may perform a data transformation based on the tasks. In some cases, the data manager 575 may improve system security and redundancy by performing data backups.

The application server 505 may update the execution plan. In some cases, the applications server 505 may execute a second subset of tasks. For example, the application server 505 may transmit the tasks to a stream processor 580, and an asset manager 585 may launch jobs associated with the tasks on a data manager 590. In some cases, the monitoring component 545 may receive messages from the stream processor 580 and/or the cache 555. For example, the monitoring component 545 may receive messages indicating that particular tasks have completed, and the application server 505 may update the execution plan based on the received messages.

Figure 6:
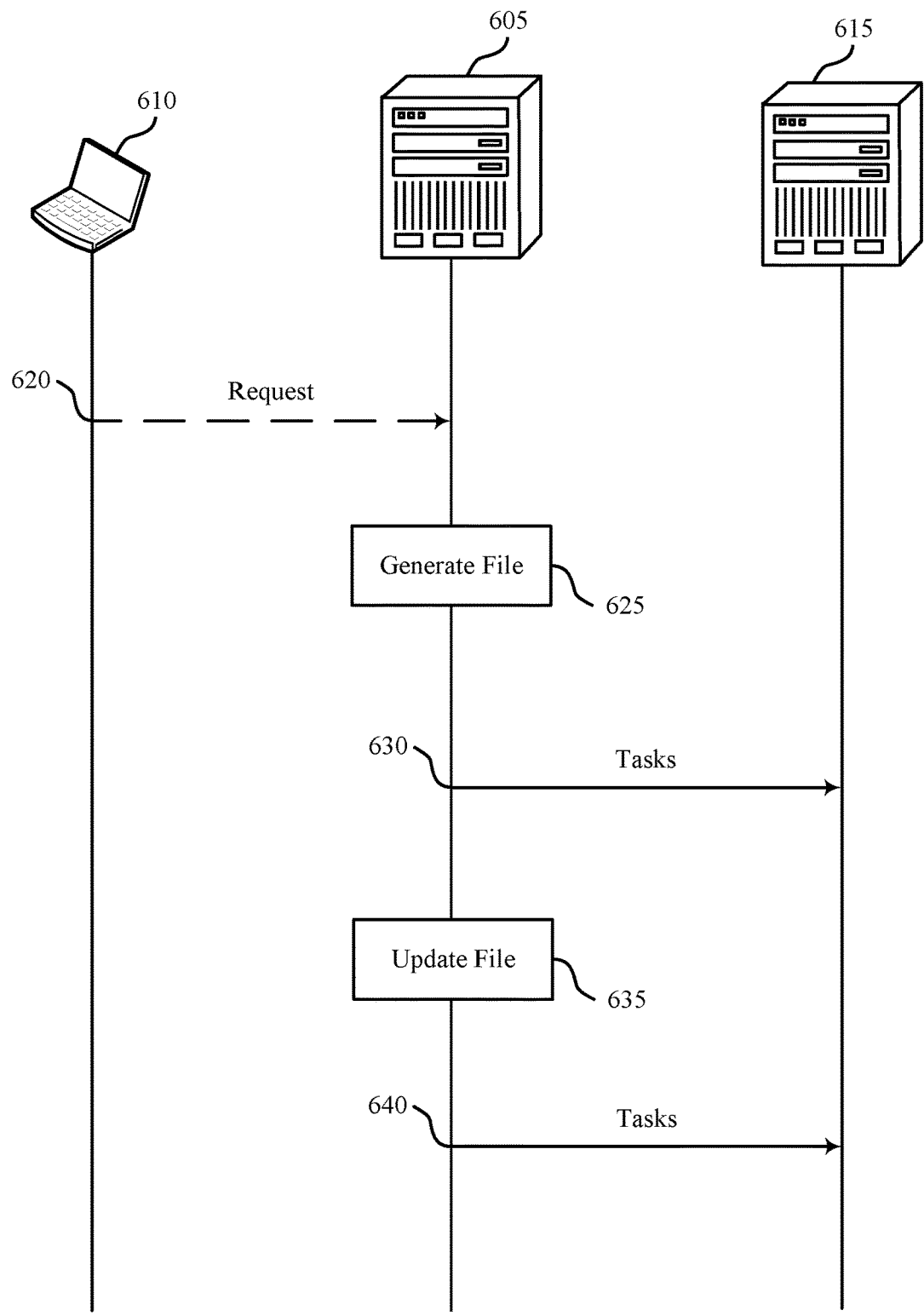
FIG. 6 illustrates an example of a process flow that supports orchestration for data pipeline execution plans in accordance with aspects of the present disclosure.

FIG. 6 illustrates an example of a process flow 600 that supports orchestration for data pipeline execution plans in accordance with aspects of the present disclosure. The process flow 600 includes an orchestration server 605, a user device 610, and an application server 615 (which may be an example or a component of a data processing or data management system). These may be examples of the corresponding devices described with reference to FIGS. 1 through 5. The orchestration server 605 may implement orchestration for data pipeline execution plans in response to a request (e.g., a data modification request) received from the user device 610. In some cases, the orchestration serer 605 may execute tasks on application server 615 based on the execution plan. Orchestration for data pipeline execution plans may improve a user's ability to interact with a data modification process, decrease system latency, and enforce task dependencies. Alternative examples of the following may be implemented, where some steps are performed in a different order than described or are not performed at all. In some cases, steps may include additional features not mentioned below, or further steps may be added.

At 620, the orchestration server 605 may receive a request for a data modification process from a user device 610. In some cases, the request may define a data modification process. For example, the request may define a user group and an analytical summary of fields associated with the user group (e.g., from which to build a dataset). In some additional or alternative cases, the request may define a data modification that is to be performed at a particular time or on a particular schedule. The request for the data modification process may, in some cases, be based on a pre-scheduled request.

At 625, the orchestration server 605 may generate an execution file (e.g., an execution plan) based on the request. In some cases, the execution file may include a set of tasks for performing the data modification and an order for performing the set of tasks. In some additional or alternative cases, the execution file may include task dependencies indicating which tasks depend on which other tasks. The task dependencies may, in some cases, be represented by a directed acyclic graph (DAG).

At 630, the orchestration server 605 may execute a first subset of tasks of the set of tasks according to the order for performing the set of tasks. In some cases, the first subset of tasks may be performed concurrently, which may improve system efficiency and decrease latency. In some cases, the orchestration server 605 may monitor the first subset of tasks for completion.

At 635, the orchestration server 605 may update the execution file based on executing the first subset of tasks. In some cases, the orchestration server 605 may modify a second subset of tasks of the set of tasks. For example, the orchestration server 605 may modify the second subset of tasks based on a data result associated with the first subset of tasks. In some additional or alternative examples, the orchestration server 605 may modify the second subset of tasks based on a user input (e.g., from the user device 610). Modification of the second subset of tasks may include adding additional tasks to the execution file, removing tasks from the execution file, changing the order of tasks, changing a system or device for performing a task, or altering the expected result of a task.

At 640, the orchestration server 605 may execute the modified second subset of tasks according to the order for performing the set of tasks. In some cases, the second subset of tasks may be performed concurrently, which may improve system efficiency. In some additional or alternative cases, one or more tasks of the second subset of tasks may use a data result obtained from a task of the first subset of tasks or otherwise depend on a task of the first subset of tasks. Performing the second subset of tasks after the first subset of tasks may uphold task dependencies and prevent errors or inaccurate data results. In some cases, one or more tasks of the second subset of tasks may be executed prior to completion of one or more tasks of the first subset of tasks (e.g., for reduced processing latency).

Figure 7:
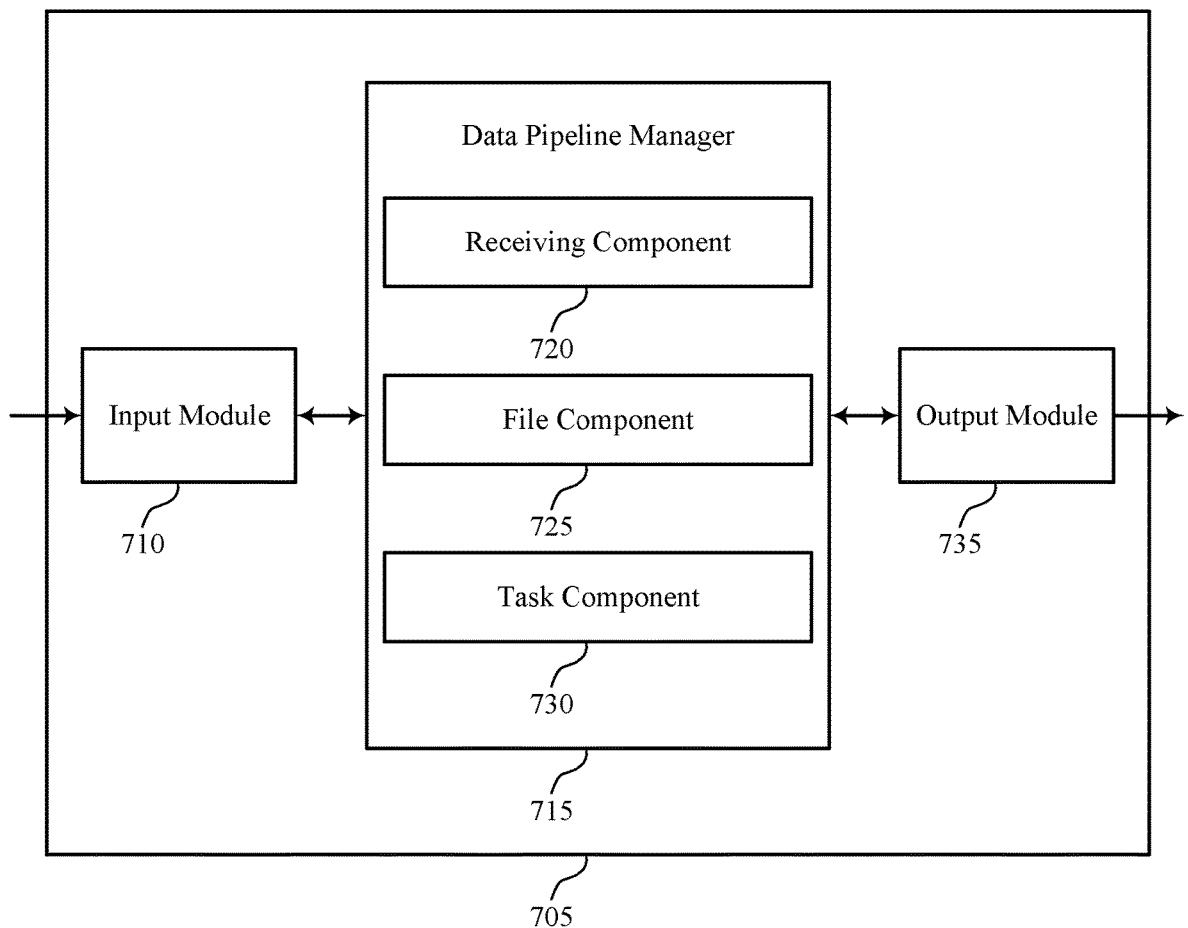
FIG. 7 shows a block diagram of an apparatus that supports orchestration for data pipeline execution plans in accordance with aspects of the present disclosure.

FIG. 7 shows a block diagram 700 of an apparatus 705 that supports orchestration for data pipeline execution plans in accordance with aspects of the present disclosure. The apparatus 705 may include an input module 710, a data pipeline manager 715, and an output module 735. The apparatus 705 may also include a processor. Each of these components may be in communication with one another (e.g., via one or more buses). In some cases, the apparatus 705 may be an example of a user terminal, a database server, or a system containing multiple computing devices. Alternative examples of the following may be implemented, where some steps are performed in a different order than described or are not performed at all. In some cases, steps may include additional features not mentioned below, or further steps may be added.

The input module 710 may manage input signals for the apparatus 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the apparatus 705 for processing. For example, the input module 710 may transmit input signals to the data pipeline manager 715 to support orchestration for data pipelines. In some cases, the input module 710 may be a component of an input/output (I/O) controller 915 as described with reference to FIG. 9.

The data pipeline manager 715 may include a receiving component 720, a file component 725, and a task component 730. The data pipeline manager 715 may be an example of aspects of the data pipeline manager 805 or 910 described with reference to FIGS. 8 and 9. In some cases, the receiving component 720 may be connected to or a component of the input module 710.

The data pipeline manager 715 and/or at least some of its various sub-components may be implemented in hardware, software executed by a processor, firmware, or any combination thereof. If implemented in software executed by a processor, the functions of the data pipeline manager 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The data pipeline manager 715 and/or at least some of its various sub-components may be physically located at various positions, including being distributed such that portions of functions are implemented at different physical locations by one or more physical devices. In some examples, the data pipeline manager 715 and/or at least some of its various sub-components may be a separate and distinct component in accordance with various aspects of the present disclosure. In other examples, the data pipeline manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The receiving component 720 may receive, from a user device, a request defining a data modification process.

The file component 725 may generate an execution file based on the request, where the execution file includes a set of tasks for performing the data modification process and an order for performing the set of tasks. The task component 730 may execute, for the execution file, a first subset of tasks of the set of tasks according to the order for performing the set of tasks.

The file component 725 may update the execution file based on executing the first subset of tasks, where the updating involves modifying a second subset of tasks of the set of tasks. The task component 730 may additionally execute, for the updated execution file, the modified second subset of tasks according to the order for performing the set of tasks.

The output module 735 may manage output signals for the apparatus 705. For example, the output module 735 may receive signals from other components of the apparatus 705, such as the data pipeline manager 715, and may transmit these signals to other components or devices. In some specific examples, the output module 735 may transmit output signals for display in a user interface, for storage in a database or data store, for further processing at a server or server cluster, or for any other processes at any number of devices or systems. In some cases, the output module 735 may be a component of an I/O controller 915 as described with reference to FIG. 9.

Figure 8:
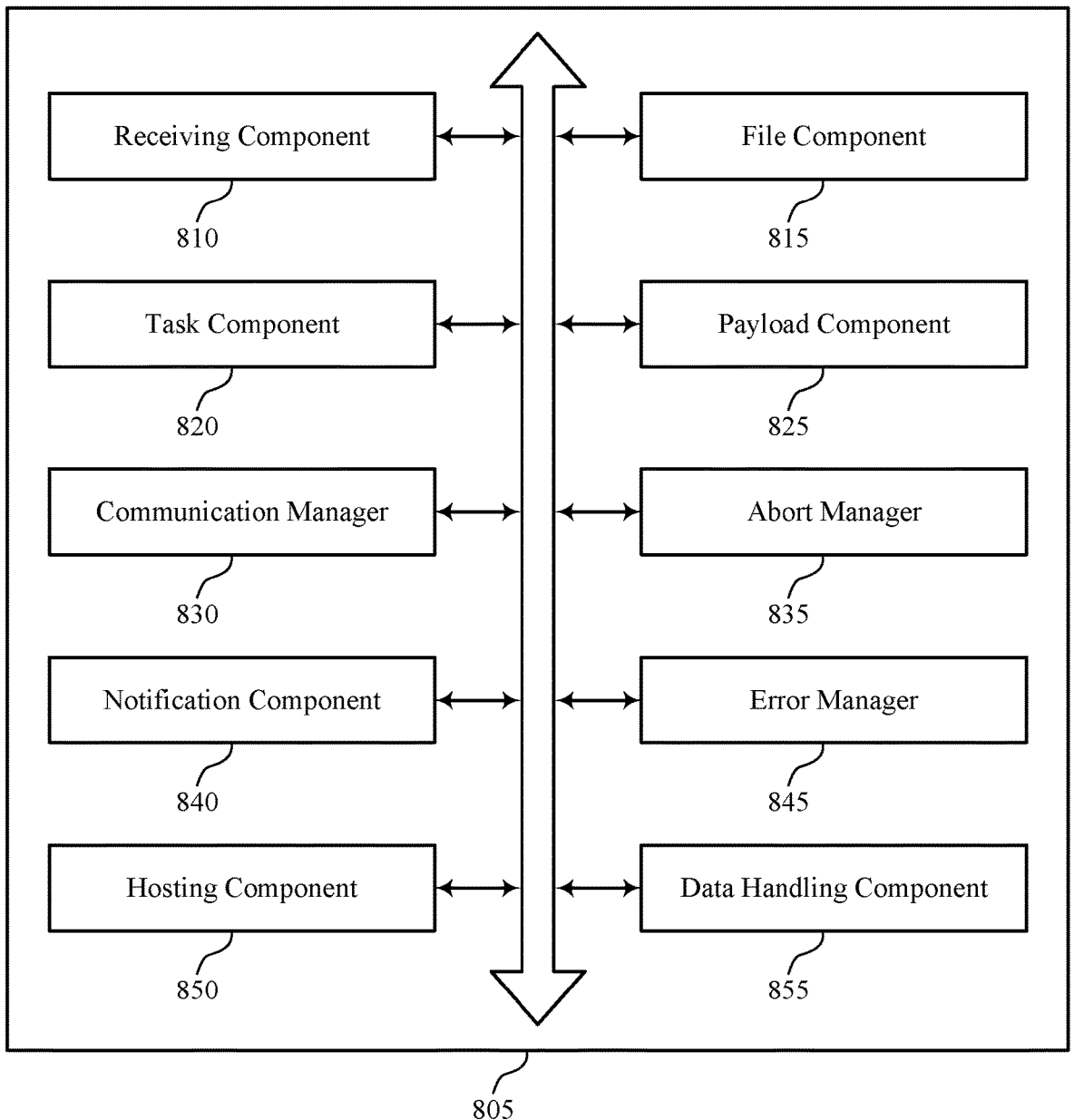
FIG. 8 shows a block diagram of a data pipeline manager that supports orchestration for data pipeline execution plans in accordance with aspects of the present disclosure.

FIG. 8 shows a block diagram 800 of a data pipeline manager 805 that supports orchestration for data pipeline execution plans in accordance with aspects of the present disclosure. The data pipeline manager 805 may be an example of aspects of a data pipeline manager 715 or a data pipeline manager 910 described herein. The data pipeline manager 805 may include a receiving component 810, a file component 815, a task component 820, a payload component 825, a communication manager 830, an abort manager 835, a notification component 840, an error manager 845, a hosting component 850, and a data handling component 855. Each of these modules may communicate, directly or indirectly, with one another (e.g., via one or more buses).

The receiving component 810 may receive, from a user device, a request defining a data modification process. In some cases, the request is received based on a user selection, a data processing schedule, an execution trigger, or a combination thereof.

The file component 815 may generate an execution file based on the request, where the execution file includes a set of tasks for performing the data modification process and an order for performing the set of tasks. The task component 820 may execute, for the execution file, a first subset of tasks of the set of tasks according to the order for performing the set of tasks.

In some examples, the file component 815 may update the execution file based on executing the first subset of tasks, where the updating includes modifying a second subset of tasks of the set of tasks. In some such examples, the task component 820 may execute, for the updated execution file, the modified second subset of tasks according to the order for performing the set of tasks.

The payload component 825 may generate, on-the-fly for each task of the first subset of tasks and the modified second subset of tasks, a respective payload for each task indicating a data process and a system for performing the data process. In some cases, the respective payload for each task includes a respective JSON file. In some examples, the set of tasks may include a first task and a second task, and the task component 820 may execute, for the execution file, the first task according to the order for performing the set of tasks. The payload component 825 may generate a payload for the second task based on an output of the executed first task.

In some examples, the communication manager 830 may communicate with a set of systems based on a set of generated payloads corresponding to the first subset of tasks and the modified second subset of tasks. In some examples, the communication manager 830 may receive, from a first system of the set of systems, a dataset as an output of executing a first task of the first subset of tasks or the modified second subset of tasks. In some examples, the communication manager 830 may store, in intermediate storage, the dataset. In some examples, the communication manager 830 may transmit, to a second system of the set of systems, the dataset from the intermediate storage for executing a second task of the first subset of tasks or the modified second subset of tasks.

The abort manager 835 may receive, from the user device, an abort command for the data modification process. In some examples, the abort manager 835 may abort execution of the execution file in response to the abort command, where a third subset of tasks of the set of tasks is unexecuted (e.g., not executed by a device or system) based on the aborted execution.

The notification component 840 may send, for display in a user interface of the user device, an indication of the data modification process and the set of tasks for performing the data modification process. In some examples, the notification component 840 may send, for display in the user interface of the user device, a notification based on an output of executing the first subset of tasks, executing the modified second subset of tasks, or a combination thereof.

In some examples, the receiving component 810 may receive, from the user device, a user input to the user interface for a third subset of tasks of the set of tasks. The file component 815 may further update the execution file based on the user input, where the further updating includes modifying the third subset of tasks. The task component 820 may execute, for the further updated execution file, the modified third subset of tasks according to the order for performing the set of tasks.

The error manager 845 may identify an error associated with executing a task of the first subset of tasks or the modified second subset of tasks and may send, for display in the user interface of the user device, a notification indicating the error and the task of the first subset of tasks or the modified second subset of tasks.

The hosting component 850 may host a set of data pipeline managers. In some examples, the hosting component 850 may identify that the request corresponds to a data pipeline manager of the set of data pipeline managers, where the execution file is generated by the data pipeline manager based on the request and processing logic for the data pipeline manager.

The data handling component 855 may perform one or more filter operations, one or more join operations, one or more grouping operations, one or more sorting operations, one or more format conversion operations, one or more validation operations, or a combination thereof for the data modification process.

Figure 9:
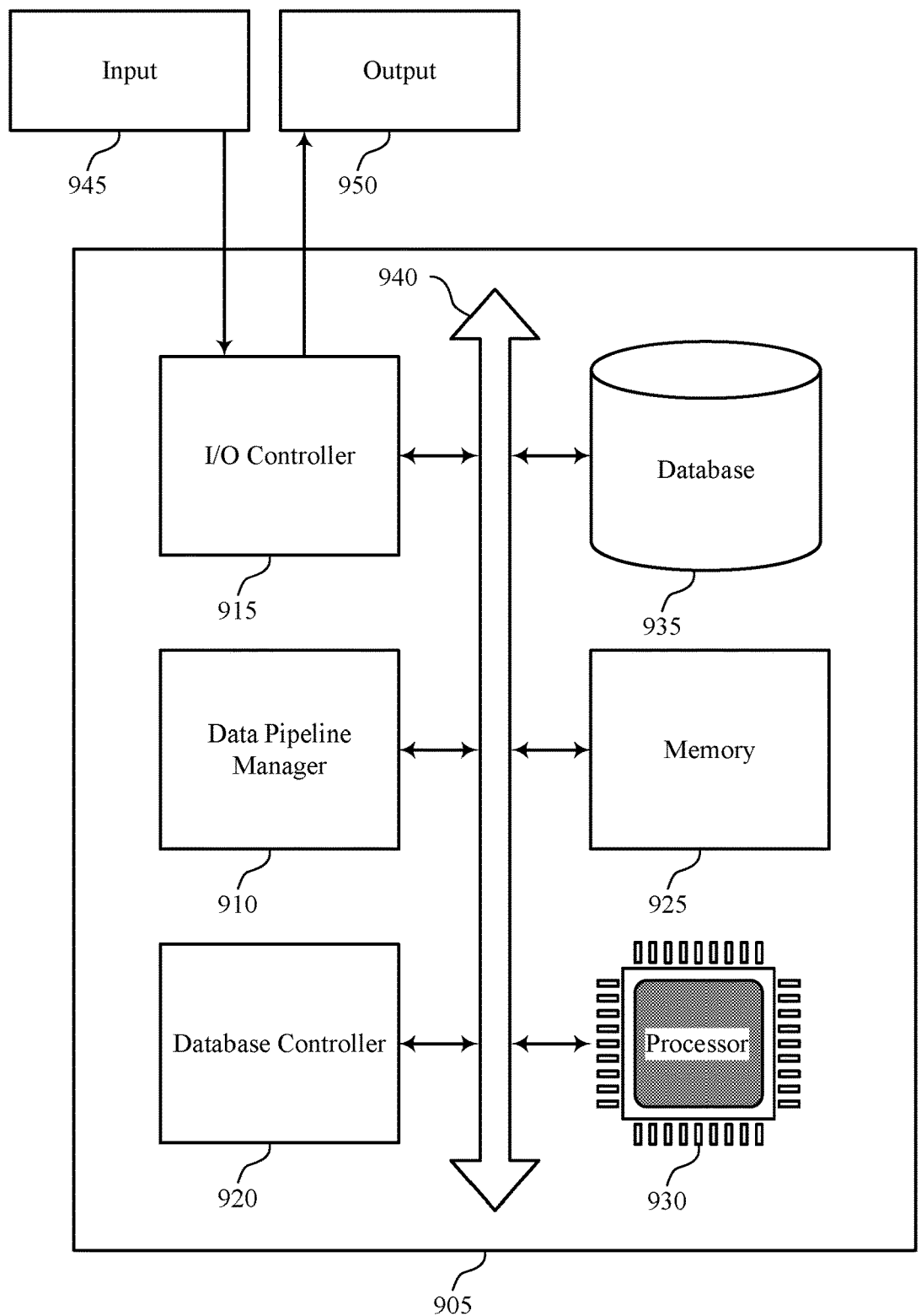
FIG. 9 shows a diagram of a system including a device that supports orchestration for data pipeline execution plans in accordance with aspects of the present disclosure.

FIG. 9 shows a diagram of a system 900 including a device 905 that supports orchestration for data pipeline execution plans in accordance with aspects of the present disclosure. The device 905 may be an example of or include the components of an application server or an apparatus 705 as described herein. The device 905 may include components for bi-directional data communications including components for transmitting and receiving communications, including a data pipeline manager 910, an I/O controller 915, a database controller 920, memory 925, a processor 930, and a database 935. These components may be in electronic communication via one or more buses (e.g., bus 940).

The data pipeline manager 910 may be an example of a data pipeline manager 715 or 805 as described herein. For example, the data pipeline manager 910 may perform any of the methods or processes described above with reference to FIGS. 7 and 8. In some cases, the data pipeline manager 910 may be implemented in hardware, software executed by a processor, firmware, or any combination thereof.

The I/O controller 915 may manage input signals 945 and output signals 950 for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The database controller 920 may manage data storage and processing in a database 935. In some cases, a user may interact with the database controller 920. In other cases, the database controller 920 may operate automatically without user interaction. The database 935 may be an example of a single database, a distributed database, multiple distributed databases, a data store, a data lake, or an emergency backup database.

Memory 925 may include random-access memory (RAM) and read-only memory (ROM). The memory 925 may store computer-readable, computer-executable software including instructions that, when executed, cause the processor to perform various functions described herein. In some cases, the memory 925 may contain, among other things, a basic I/O system (BIOS) which may control basic hardware or software operation such as the interaction with peripheral components or devices.

The processor 930 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting orchestration for data pipeline execution plans).

Figure 10:
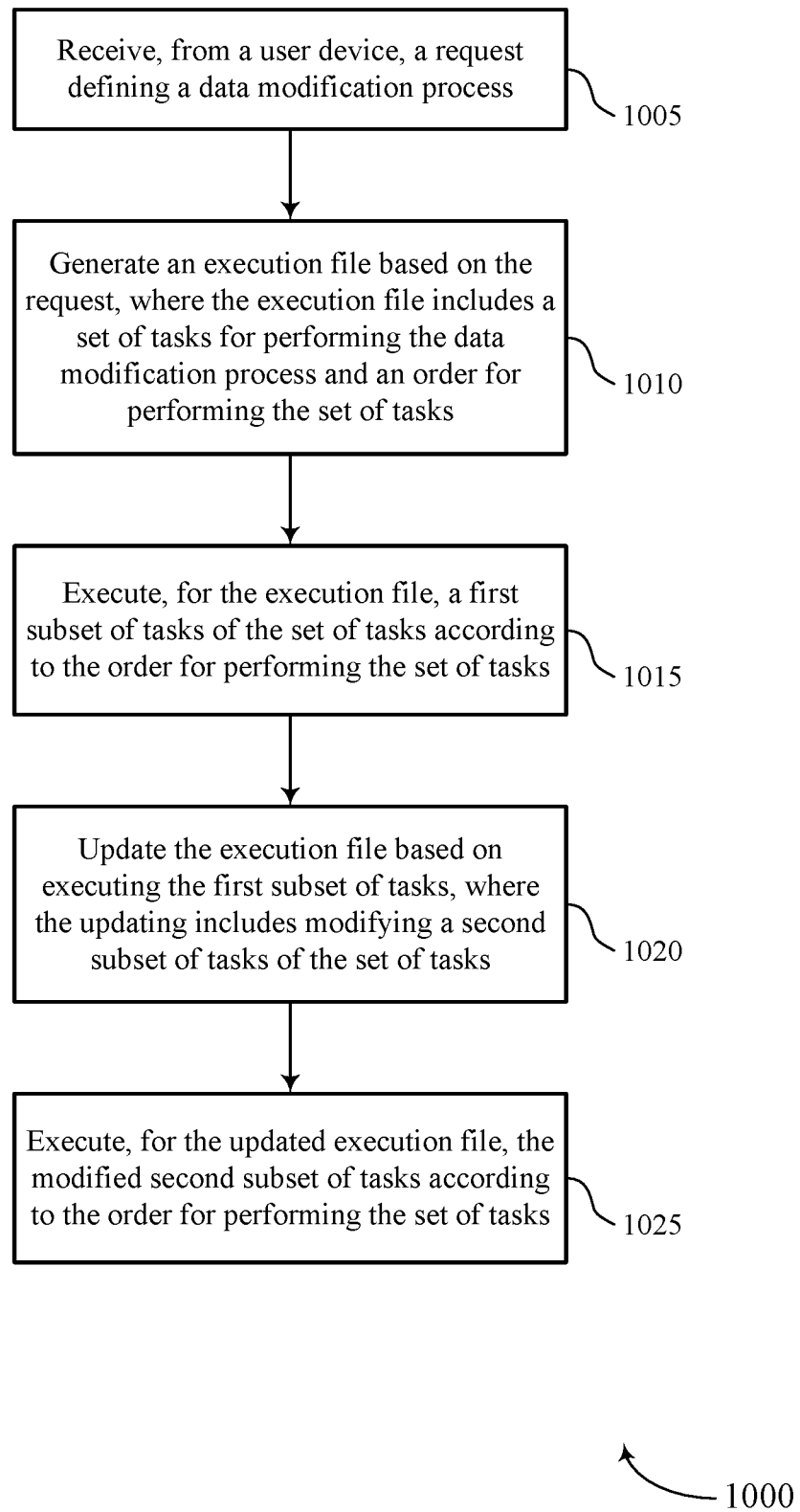
FIGS. 10 through 12 show flowcharts illustrating methods that support orchestration for data pipeline execution plans in accordance with aspects of the present disclosure.

FIG. 10 shows a flowchart illustrating a method 1000 that supports orchestration for data pipeline execution plans in accordance with aspects of the present disclosure. The operations of method 1000 may be implemented by an application server or its components as described herein. For example, the operations of method 1000 may be performed by a data pipeline manager as described with reference to FIGS. 7 through 9. In some examples, an application server may execute a set of instructions to control the functional elements of the application server to perform the functions described below. Additionally or alternatively, the application server may perform aspects of the functions described below using special-purpose hardware.

At 1005, the application server (e.g., a single server, a server cluster, or some other device or system supporting data processing and orchestration) may receive, from a user device, a request defining a data modification process. The operations of 1005 may be performed according to the methods described herein. In some examples, aspects of the operations of 1005 may be performed by a receiving component as described with reference to FIGS. 7 through 9.

At 1010, the application server may generate an execution file based on the request, where the execution file includes a set of tasks for performing the data modification process and an order for performing the set of tasks. The operations of 1010 may be performed according to the methods described herein. In some examples, aspects of the operations of 1010 may be performed by a file component as described with reference to FIGS. 7 through 9.

At 1015, the application server may execute, for the execution file, a first subset of tasks of the set of tasks according to the order for performing the set of tasks. The operations of 1015 may be performed according to the methods described herein. In some examples, aspects of the operations of 1015 may be performed by a task component as described with reference to FIGS. 7 through 9.

At 1020, the application server may update the execution file based on executing the first subset of tasks, where the updating includes modifying a second subset of tasks of the set of tasks. The operations of 1020 may be performed according to the methods described herein. In some examples, aspects of the operations of 1020 may be performed by a file component as described with reference to FIGS. 7 through 9.

At 1025, the application server may execute, for the updated execution file, the modified second subset of tasks according to the order for performing the set of tasks. The operations of 1025 may be performed according to the methods described herein. In some examples, aspects of the operations of 1025 may be performed by a task component as described with reference to FIGS. 7 through 9.

Figure 11:
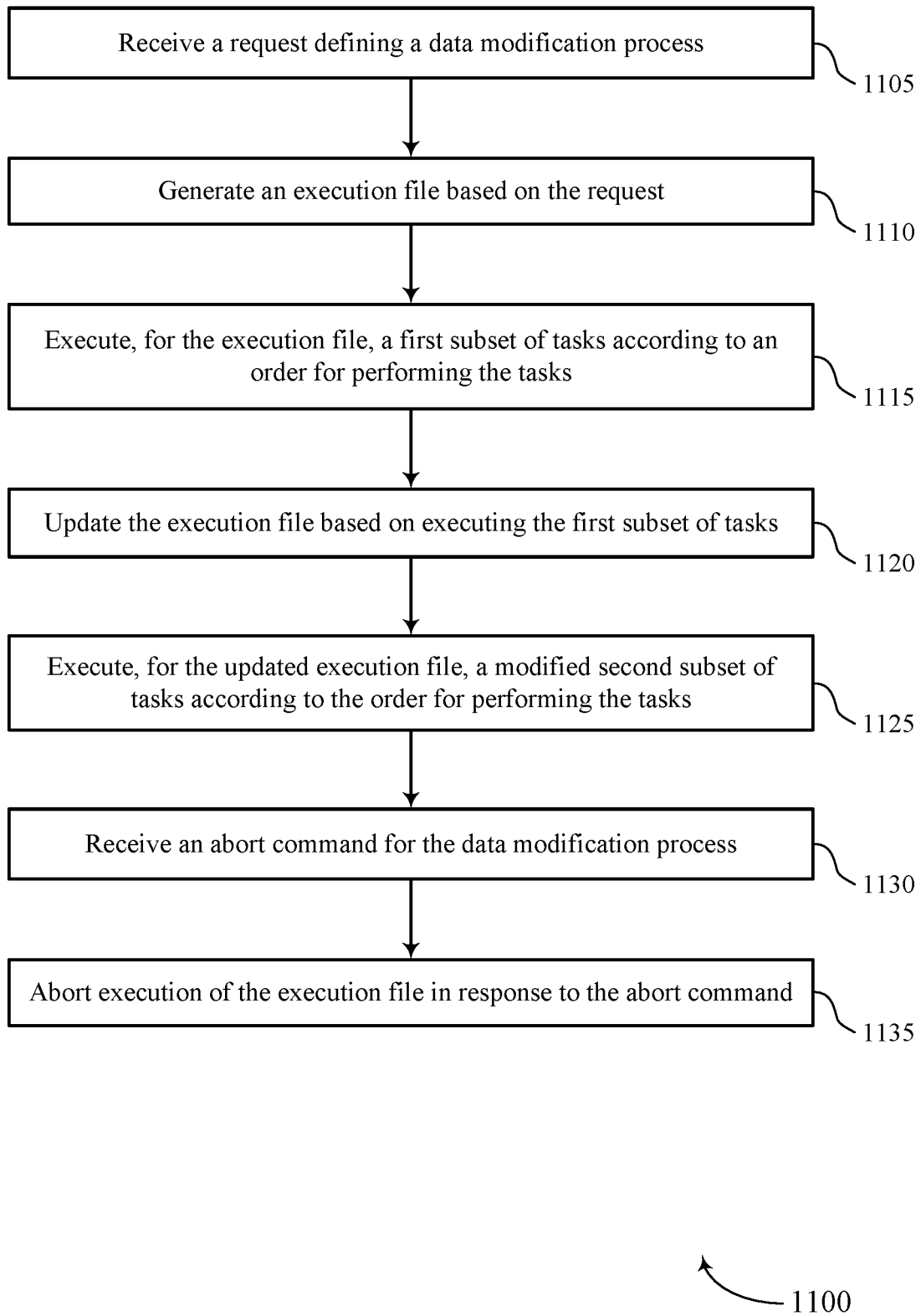

FIG. 11 shows a flowchart illustrating a method 1100 that supports orchestration for data pipeline execution plans in accordance with aspects of the present disclosure. The operations of method 1100 may be implemented by an application server or its components as described herein. For example, the operations of method 1100 may be performed by a data pipeline manager as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1105, the application server (e.g., a single server, a server cluster, or some other device or system supporting data processing and orchestration) may receive, from a user device, a request defining a data modification process. The operations of 1105 may be performed according to the methods described herein. In some examples, aspects of the operations of 1105 may be performed by a receiving component as described with reference to FIGS. 7 through 9.

At 1110, the application server may generate an execution file based on the request, where the execution file includes a set of tasks for performing the data modification process and an order for performing the set of tasks. The operations of 1110 may be performed according to the methods described herein. In some examples, aspects of the operations of 1110 may be performed by a file component as described with reference to FIGS. 7 through 9.

At 1115, the application server may execute, for the execution file, a first subset of tasks of the set of tasks according to the order for performing the set of tasks. The operations of 1115 may be performed according to the methods described herein. In some examples, aspects of the operations of 1115 may be performed by a task component as described with reference to FIGS. 7 through 9.

At 1120, the application server may update the execution file based on executing the first subset of tasks, where the updating includes modifying a second subset of tasks of the set of tasks. The operations of 1120 may be performed according to the methods described herein. In some examples, aspects of the operations of 1120 may be performed by a file component as described with reference to FIGS. 7 through 9.

At 1125, the application server may execute, for the updated execution file, the modified second subset of tasks according to the order for performing the set of tasks. The operations of 1125 may be performed according to the methods described herein. In some examples, aspects of the operations of 1125 may be performed by a task component as described with reference to FIGS. 7 through 9.

At 1130, the application server may receive, from the user device, an abort command for the data modification process. The operations of 1130 may be performed according to the methods described herein. In some examples, aspects of the operations of 1130 may be performed by an abort manager as described with reference to FIGS. 7 through 9.

At 1135, the application server may abort execution of the execution file in response to the abort command, where a third subset of tasks of the set of tasks is not executed based on the aborted execution. The operations of 1135 may be performed according to the methods described herein. In some examples, aspects of the operations of 1135 may be performed by an abort manager as described with reference to FIGS. 7 through 9.

Figure 12:
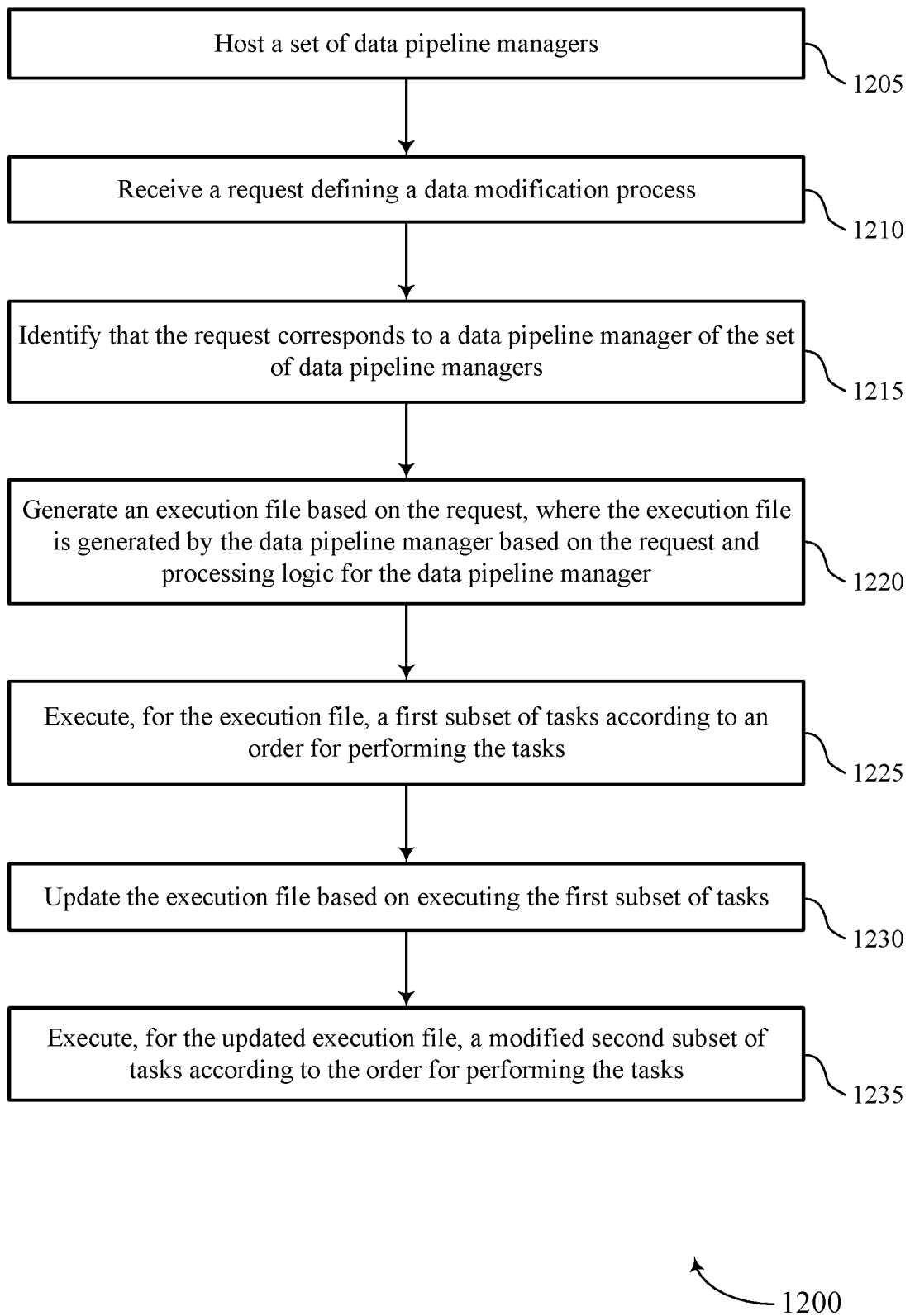

FIG. 12 shows a flowchart illustrating a method 1200 that supports orchestration for data pipeline execution plans in accordance with aspects of the present disclosure. The operations of method 1200 may be implemented by an application server or its components as described herein. For example, the operations of method 1200 may be performed by a data pipeline manager as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1205, the application server may host a set of data pipeline managers. The operations of 1205 may be performed according to the methods described herein. In some examples, aspects of the operations of 1205 may be performed by a hosting component as described with reference to FIGS. 7 through 9.

At 1210, the application server may receive, from a user device, a request defining a data modification process. The operations of 1210 may be performed according to the methods described herein. In some examples, aspects of the operations of 1210 may be performed by a receiving component as described with reference to FIGS. 7 through 9.

At 1215, the application server may identify that the request corresponds to a data pipeline manager of the set of data pipeline managers. The operations of 1215 may be performed according to the methods described herein. In some examples, aspects of the operations of 1215 may be performed by a hosting component as described with reference to FIGS. 7 through 9.

At 1220, the application server may generate an execution file based on the request, where the execution file includes a set of tasks for performing the data modification process and an order for performing the set of tasks. The execution file may be generated by the data pipeline manager based on the request and processing logic for the data pipeline manager. The operations of 1220 may be performed according to the methods described herein. In some examples, aspects of the operations of 1220 may be performed by a file component as described with reference to FIGS. 7 through 9.

At 1225, the application server may execute, for the execution file, a first subset of tasks of the set of tasks according to the order for performing the set of tasks. The operations of 1225 may be performed according to the methods described herein. In some examples, aspects of the operations of 1225 may be performed by a task component as described with reference to FIGS. 7 through 9.

At 1230, the application server may update the execution file based on executing the first subset of tasks, where the updating includes modifying a second subset of tasks of the set of tasks. The operations of 1230 may be performed according to the methods described herein. In some examples, aspects of the operations of 1230 may be performed by a file component as described with reference to FIGS. 7 through 9.

At 1235, the application server may execute, for the updated execution file, the modified second subset of tasks according to the order for performing the set of tasks. The operations of 1235 may be performed according to the methods described herein. In some examples, aspects of the operations of 1235 may be performed by a task component as described with reference to FIGS. 7 through 9.

A method for data processing is described. The method may include receiving, from a user device, a request defining a data modification process; generating an execution file based on the request, where the execution file includes a set of tasks for performing the data modification process and an order for performing the set of tasks; executing, for the execution file, a first subset of tasks of the set of tasks according to the order for performing the set of tasks; updating the execution file based on executing the first subset of tasks, where the updating includes modifying a second subset of tasks of the set of tasks; and executing, for the updated execution file, the modified second subset of tasks according to the order for performing the set of tasks.

An apparatus for data processing is described. The apparatus may include a processor, memory coupled with the processor, and instructions stored in the memory. The instructions may be executable by the processor to cause the apparatus to receive, from a user device, a request defining a data modification process; generate an execution file based on the request, where the execution file includes a set of tasks for performing the data modification process and an order for performing the set of tasks; execute, for the execution file, a first subset of tasks of the set of tasks according to the order for performing the set of tasks; update the execution file based on executing the first subset of tasks, where the updating includes modifying a second subset of tasks of the set of tasks; and execute, for the updated execution file, the modified second subset of tasks according to the order for performing the set of tasks.

Another apparatus for data processing is described. The apparatus may include means for receiving, from a user device, a request defining a data modification process; means for generating an execution file based on the request, where the execution file includes a set of tasks for performing the data modification process and an order for performing the set of tasks; means for executing, for the execution file, a first subset of tasks of the set of tasks according to the order for performing the set of tasks; means for updating the execution file based on executing the first subset of tasks, where the updating includes modifying a second subset of tasks of the set of tasks; and means for executing, for the updated execution file, the modified second subset of tasks according to the order for performing the set of tasks.

A non-transitory computer-readable medium storing code for data processing is described. The code may include instructions executable by a processor to receive, from a user device, a request defining a data modification process; generate an execution file based on the request, where the execution file includes a set of tasks for performing the data modification process and an order for performing the set of tasks; execute, for the execution file, a first subset of tasks of the set of tasks according to the order for performing the set of tasks; update the execution file based on executing the first subset of tasks, where the updating includes modifying a second subset of tasks of the set of tasks; and execute, for the updated execution file, the modified second subset of tasks according to the order for performing the set of tasks.

In some examples of the method, apparatuses, and non-transitory computer-readable medium described herein, executing the first subset of tasks and executing the modified second subset of tasks may further include operations, features, means, or instructions for generating, on-the-fly for each task of the first subset of tasks and the modified second subset of tasks, a respective payload for each task indicating a data process and a system for performing the data process.

In some examples of the method, apparatuses, and non-transitory computer-readable medium described herein, the set of tasks may include a first task and a second task. Some examples of the method, apparatuses, and non-transitory computer-readable medium described herein may further include operations, features, means, or instructions for executing, for the execution file, the first task according to the order for performing the set of tasks and generating a payload for the second task based on an output of the executed first task.

In some examples of the method, apparatuses, and non-transitory computer-readable medium described herein, executing the first subset of tasks and executing the modified second subset of tasks may further include operations, features, means, or instructions for communicating with a set of systems based on a set of generated payloads corresponding to the first subset of tasks and the modified second subset of tasks.

In some examples of the method, apparatuses, and non-transitory computer-readable medium described herein, communicating with the set of systems may include operations, features, means, or instructions for receiving, from a first system of the set of systems, a dataset as an output of executing a first task of the first subset of tasks or the modified second subset of tasks, storing, in intermediate storage, the dataset, and transmitting, to a second system of the set of systems, the dataset from the intermediate storage for executing a second task of the first subset of tasks or the modified second subset of tasks.

In some examples of the method, apparatuses, and non-transitory computer-readable medium described herein, the respective payload for each task includes a respective JSON file.

Some examples of the method, apparatuses, and non-transitory computer-readable medium described herein may further include operations, features, means, or instructions for receiving, from the user device, an abort command for the data modification process and aborting execution of the execution file in response to the abort command, where a third subset of tasks of the set of tasks may be unexecuted based on the aborted execution.

Some examples of the method, apparatuses, and non-transitory computer-readable medium described herein may further include operations, features, means, or instructions for sending, for display in a user interface of the user device, an indication of the data modification process and the set of tasks for performing the data modification process.

Some examples of the method, apparatuses, and non-transitory computer-readable medium described herein may further include operations, features, means, or instructions for receiving, from the user device, a user input to the user interface for a third subset of tasks of the set of tasks, further updating the execution file based on the user input, where the further updating includes modifying the third subset of tasks, and executing, for the further updated execution file, the modified third subset of tasks according to the order for performing the set of tasks.

Some examples of the method, apparatuses, and non-transitory computer-readable medium described herein may further include operations, features, means, or instructions for identifying an error associated with executing a task of the first subset of tasks or the modified second subset of tasks and sending, for display in the user interface of the user device, a notification indicating the error and the task of the first subset of tasks or the modified second subset of tasks.

Some examples of the method, apparatuses, and non-transitory computer-readable medium described herein may further include operations, features, means, or instructions for sending, for display in the user interface of the user device, a notification based on an output of executing the first subset of tasks, executing the modified second subset of tasks, or a combination thereof.

Some examples of the method, apparatuses, and non-transitory computer-readable medium described herein may further include operations, features, means, or instructions for hosting a set of data pipeline managers and identifying that the request corresponds to a data pipeline manager of the set of data pipeline managers, where the execution file may be generated by the data pipeline manager based on the request and processing logic for the data pipeline manager.

In some examples of the method, apparatuses, and non-transitory computer-readable medium described herein, the data modification process includes one or more filter operations, one or more join operations, one or more grouping operations, one or more sorting operations, one or more format conversion operations, one or more validation operations, or a combination thereof.

In some examples of the method, apparatuses, and non-transitory computer-readable medium described herein, the request may be received based on a user selection, a data processing schedule, an execution trigger, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
receiving, at an orchestration server and from a user device, a request defining a data modification process;
generating, at the orchestration server, an execution file based at least in part on the request, wherein the execution file comprises a first subset of tasks of a set of tasks and a second subset of tasks of the set of tasks for performing the data modification process across a plurality of systems, and the execution file defines an execution order for performing the first subset of tasks and the second subset of tasks;
sending, from the orchestration server and for display via a user interface of the user device, a user view of an execution plan for the data modification process based at least in part on the execution file, the user view of the execution plan comprising a plurality of steps corresponding to the set of tasks, wherein the plurality of systems is transparent to the user view based on the user view refraining from indicating which system of the plurality of systems performs which step of the plurality of steps;
executing, at the orchestration server and for the execution file, the first subset of tasks according to the execution order for performing the set of tasks;
updating, at the orchestration server, the execution file based at least in part on executing the first subset of tasks, wherein the updating the execution file comprises modifying the second subset of tasks to comprise a payload based at least in part on an output of the executed first subset of tasks and communicating with the plurality of systems based at least in part on a plurality of generated payloads corresponding to the first subset of tasks and the modified second subset of tasks, the payload comprising a file indicating a data process and further indicating a system of the plurality of systems for performing the data process;
updating, from the orchestration server and for display via the user interface of the user device, the user view of the execution plan based at least in part on the updated execution file; and
executing, at the orchestration server and for the updated execution file, the modified second subset of tasks according to the execution order for performing the set of tasks and the payload.

2. The method of claim 1, wherein executing the first subset of tasks and executing the modified second subset of tasks comprise:
generating, on-the-fly for each task of the first subset of tasks and the modified second subset of tasks, a respective payload for each task indicating a respective data process and a respective system of the plurality of systems for performing the respective data process.

3. The method of claim 1, wherein communicating with the plurality of systems comprises:

receiving, from a first system of the plurality of systems, a dataset as a first output of executing a first task of the first subset of tasks or the modified second subset of tasks;

storing, in intermediate storage, the dataset; and transmitting, to a second system of the plurality of systems, the dataset from the intermediate storage for executing a second task of the first subset of tasks or the modified second subset of tasks.

4. The method of claim 2, wherein the respective payload for each task comprises a respective JavaScript Object Notation file.

5. The method of claim 1, further comprising:

receiving, from the user device, an abort command for the data modification process; and aborting execution of the execution file in response to the abort command, wherein a third subset of tasks of the set of tasks is unexecuted based at least in part on the aborted execution.

6. The method of claim 1, further comprising:

receiving, from the user device, a user input to the user interface for a third subset of tasks of the set of tasks;

further updating, at the orchestration server, the execution file based at least in part on the user input, wherein the further updating the execution file comprises modifying the third subset of tasks; and executing, for the further updated execution file, the modified third subset of tasks according to the execution order for performing the set of tasks.

7. The method of claim 1, further comprising:

identifying an error associated with executing a task of the first subset of tasks or the modified second subset of tasks; and sending, for display via the user interface of the user device, a notification indicating the error and the task of the first subset of tasks or the modified second subset of tasks.

8. The method of claim 1, further comprising:

sending, for display via the user interface of the user device, a notification based at least in part on one or more outputs of executing the first subset of tasks, executing the modified second subset of tasks, or a combination thereof.

9. The method of claim 1, further comprising:

hosting a plurality of data pipeline managers; and identifying that the request corresponds to a data pipeline manager of the plurality of data pipeline managers, wherein the execution file is generated by the data pipeline manager based at least in part on the request and processing logic for the data pipeline manager, and wherein the data pipeline manager corresponds to the orchestration server.

10. The method of claim 1, wherein the data modification process comprises one or more filter operations, one or more join operations, one or more grouping operations, one or more sorting operations, one or more format conversion operations, one or more validation operations, or a combination thereof.

11. The method of claim 1, wherein the request is received based at least in part on a user selection, a data processing schedule, an execution trigger, or a combination thereof.

12. An apparatus for data processing, comprising:

a processor;

memory coupled with the processor; and instructions stored in the memory and executable by the processor to cause the apparatus to:

receive, at an orchestration server and from a user device, a request defining a data modification process;

generate, at the orchestration server, an execution file based at least in part on the request, wherein the execution file comprises a first subset of tasks of a set of tasks and a second subset of tasks of the set of tasks for performing the data modification process across a plurality of systems, and the execution file defines an execution order for performing the first subset of tasks and the second subset of tasks;

send, from the orchestration server and for display via a user interface of the user device, a user view of an execution plan for the data modification process based at least in part on the execution file, the user view of the execution plan comprising a plurality of steps corresponding to the set of tasks, wherein the plurality of systems is transparent to the user view based on the user view refraining from indicating which system of the plurality of systems performs which step of the plurality of steps;

execute, at the orchestration server and for the execution file, the first subset of tasks according to the execution order for performing the set of tasks;

update, at the orchestration server, the execution file based at least in part on executing the first subset of tasks, wherein the updating the execution file comprises modifying the second subset of tasks to comprise a payload based at least in part on an output of the executed first subset of tasks and communicating with the plurality of systems based at least in part on a plurality of generated payloads corresponding to the first subset of tasks and the modified second subset of tasks, the payload comprising a file indicating a data process and further indicating a system of the plurality of systems for performing the data process;

update, from the orchestration server and for display via the user interface of the user device, the user view of the execution plan based at least in part on the updated execution file; and execute, at the orchestration server and for the updated execution file, the modified second subset of tasks according to the execution order for performing the set of tasks and the payload.

13. The apparatus of claim 12, wherein the instructions to execute the first subset of tasks and execute the modified second subset of tasks are further executable by the processor to cause the apparatus to:

generate, on-the-fly for each task of the first subset of tasks and the modified second subset of tasks, a respective payload for each task indicating a respective data process and a respective system of the plurality of systems for performing the respective data process.

14. The apparatus of claim 12, wherein the instructions to communicate with the plurality of systems are executable by the processor to cause the apparatus to:

receive, from a first system of the plurality of systems, a dataset as a first output of executing a first task of the first subset of tasks or the modified second subset of tasks;

store, in intermediate storage, the dataset; and transmit, to a second system of the plurality of systems, the dataset from the intermediate storage for executing a second task of the first subset of tasks or the modified second subset of tasks.

15. A non-transitory computer-readable medium storing code for data processing, the code comprising instructions executable by a processor to:

receive, at an orchestration server and from a user device, a request defining a data modification process;

generate, at the orchestration server, an execution file based at least in part on the request, wherein the execution file comprises a first subset of tasks of a set of tasks and a second subset of tasks of the set of tasks for performing the data modification process across a plurality of systems, and the execution file defines an execution order for performing the first subset of tasks and the second subset of tasks;

send, from the orchestration server and for display via a user interface of the user device, a user view of an execution plan for the data modification process based at least in part on the execution file, the user view of the execution plan comprising a plurality of steps corresponding to the set of tasks, wherein the plurality of systems is transparent to the user view based on the user view refraining from indicating which system of the plurality of systems performs which step of the plurality of steps;

execute, at the orchestration server and for the execution file, the first subset of tasks according to the execution order for performing the set of tasks;

update, at the orchestration server, the execution file based at least in part on executing the first subset of tasks, wherein the updating the execution file comprises modifying the second subset of tasks to comprise a payload based at least in part on an output of the executed first subset of tasks and communicating with the plurality of systems based at least in part on a plurality of generated payloads corresponding to the first subset of tasks and the modified second subset of tasks, the payload comprising a file indicating a data process and further indicating a system of the plurality of systems for performing the data process;

update, from the orchestration server and for display via the user interface of the user device, the user view of the execution plan based at least in part on the updated execution file; and execute, at the orchestration server and for the updated execution file, the modified second subset of tasks according to the execution order for performing the set of tasks and the payload.

\* \* \* \* \*